(12) United States Patent
Sakagami

(10) Patent No.: US 7,944,627 B2
(45) Date of Patent: May 17, 2011

(54) IMAGE FORMING OPTICAL SYSTEM

(75) Inventor: Norihisa Sakagami, Osaka (JP)

(73) Assignee: Nalux Co., Ltd., Osaka (JP)

( * ) Notice: Subject to any disclaimer, the term of this patent is extended or adjusted under 35 U.S.C. 154(b) by 0 days.

(21) Appl. No.: 12/650,906

(22) Filed: Dec. 31, 2009

(65) Prior Publication Data

US 2010/0172024 A1   Jul. 8, 2010

Related U.S. Application Data

(63) Continuation of application No. PCT/JP2008/065433, filed on Aug. 28, 2008.

(60) Provisional application No. 61/064,047, filed on Feb. 13, 2008.

(51) Int. Cl.
*G02B 9/34* (2006.01)
*G02B 9/60* (2006.01)
*G02B 5/18* (2006.01)

(52) U.S. Cl. ......... 359/773; 359/772; 359/770; 359/570

(58) Field of Classification Search .................. 359/570, 359/715, 770, 772, 773
See application file for complete search history.

(56) References Cited

U.S. PATENT DOCUMENTS

| | | | | |
|---|---|---|---|---|
| 7,453,654 B2 * | 11/2008 | Shinohara | ...................... | 359/773 |
| 7,561,347 B2 * | 7/2009 | Park et al. | ...................... | 359/773 |
| 7,777,972 B1 * | 8/2010 | Chen et al. | ...................... | 359/773 |
| 7,817,356 B2 * | 10/2010 | Nio | ................................ | 359/772 |
| 7,826,149 B2 * | 11/2010 | Tang et al. | ...................... | 359/715 |
| 7,859,771 B2 * | 12/2010 | Yin et al. | ...................... | 359/773 |

FOREIGN PATENT DOCUMENTS

| | | |
|---|---|---|
| JP | 2007-017984 | 1/2007 |
| JP | 2007-219079 | 8/2007 |
| JP | 2007-264498 | 10/2007 |
| JP | 2007-286153 | 11/2007 |

OTHER PUBLICATIONS

English translation of Written Opinion of the International Search Authority (PCT/ISA/237) for prepared for PCT/EP2008/001563 on Sep. 6, 2010.*

* cited by examiner

*Primary Examiner* — David N Spector
(74) *Attorney, Agent, or Firm* — Squire, Sanders & Dempsey (US) LLP

(57) ABSTRACT

To provide a compact image forming optical system in which an incident angle to an imaging plane of a solid-state imaging device is small and whose chromatic aberration, astigmatism, field curvature, and distortion are reduced. An image forming optical system of a first embodiment of the present invention comprises four lenses arranged from the object side to the imaging plane side in order, that are a first lens that is a double-convex lens, a second lens that is a double-concave lens, a third lens that is a positive meniscus lens that is convex toward an image side, and a fourth lens that is a negative meniscus lens that is convex toward an object side. An aperture is placed closer to the object than the image side surface of the first lens. The image forming optical system of the first embodiment of the present invention satisfies the following equations, where $f_i$ is an absolute value of a focal length of i-th lens, f is an absolute value of a focal length of a whole optical system, $v_{di}$ is Abbe's number of i-th lens, and TTL is a distance from the object side surface of the first lens, in the object side surface and an aperture side surface, to the imaging plane.

$$0.425 < f_1/f_4 < 0.7 \qquad (1)$$

$$25 < v_{d2} < 28 \qquad (2)$$

$$50 < v_{d1}, v_{d3}, v_{d4} < 57 \qquad (3)$$

$$0.595 < f_2/f_4 < 1.05 \qquad (4)$$

$$1.5 < f/f_1 < 2.2 \qquad (5)$$

$$f_1 < f_3 \qquad (6)$$

$$1.05 < TTL/f < 1.18 \qquad (7)$$

7 Claims, 14 Drawing Sheets

IMAGE FORMING OPTICAL SYSTEM

TECHNICAL FIELD

The present invention relates to an image forming optical system used for solid-state image sensors of digital cameras, cellular phones with a camera, scanners and the like.

BACKGROUND ART

As size reduction in digital cameras, cellular phones with a camera and the like is strongly required, size reduction in an image forming optical system used for these devices is also strongly required, Patent documents 1 and 2 disclose image forming optical systems used for solid-state image sensors of digital cameras, cellular phones with a camera, scanners and the like. In order to realize size reduction in an image forming optical system, there exists a method to reduce a distance from a lens to an image plane or a method to make the system wide-angle. However, these methods raise problems of an increase in angles of incidence to the image plane of the solid-state image sensor and lager chromatic aberration, astigmatism, field curvature and distortion. An increase in angles of incidence to the image plane of the solid-state image sensor prevents efficient image forming on the solid-state image sensor. Further, lager chromatic aberration, astigmatism, field curvature and distortion deteriorate resolution and picture quality of the imaging device.

Patent document 1: JP2007-286153A
Patent document 2: JP2007-219079A

DISCLOSURE OF THE INVENTION

Accordingly, there are needs for a compact image forming optical system in which angles of incidence to the image plane of the solid-state image sensor are made smaller and chromatic aberration, astigmatism, field curvature and distortion are reduced.

An image forming optical system according to the first aspect of the invention includes a first lens which is a biconvex lens, a second lens which is a biconcave lens, a third lens which is a positive meniscus lens convex to the image side and a fourth lens which is a negative meniscus lens convex to the object side, arranged from the object side to the image side. A field stop is located on the object side of the image side plane of the first lens. Assuming that fi represents an absolute value of focal length of the i-th lens, f represents an absolute value of focal length of the whole optical system, $v_{di}$ represents Abbe's number of the i-th lens and TTL represents a distance between the plane which is closer to the object between the object side plane of the first lens and the field stop plane and the image plane, the relations $$0.425 < f_1/f_4 < 0.7 \quad (1)$$

$$25 < v_{d2} < 28 \quad (2)$$

$$50 < v_{d1}, v_{d3}, v_{d4} < 57 \quad (3)$$

$$0.595 < f_2/f_4 < 1.05 \quad (4)$$

$$1.5 < f/f_1 < 2.2 \quad (5)$$

$$f_1 < f_3 \quad (6)$$

$$1.05 < TTL/f < 1.18 \quad (7)$$

are satisfied in the image forming optical system according to the first aspect of the invention.

In the image forming optical system according to the first aspect of the invention, four lenses respectively having positive power, negative power, positive power and negative power are advantageously combined to reduce spherical aberration and therefore to increase resolution. Further, a combination of the third lens which is a positive meniscus lens convex to the image side and the fourth lens which is a negative meniscus lens convex to the object side can reduce a field curvature. Further, since the field stop is located on the object side of the image side plane of the first lens, a size of the optical system can be achieved.

By designing an image forming optical system such that the above-described relations (1) to (7) are satisfied, a compact image forming optical system in which angles of incidence to the image plane of the solid-state image sensor are small and chromatic aberration, astigmatism, field curvature and distortion are reduced can be realized.

An image forming optical system according to the second aspect of the invention includes a first lens which is a biconvex lens, a second lens which is a biconcave lens, a third lens which is a positive meniscus lens convex to the image side and a fourth lens which is a negative meniscus lens convex to the object side, arranged from the object side to the image side. A field stop is located on the object side of the image side plane of the first lens. Assuming that fi represents an absolute value of focal length of the i-th lens, $f_{DOE}$ represents a focal length of the diffraction grating, f represents an absolute value of focal length of the whole optical system and TTL represents a distance between the plane which is closer to the object between the object side plane of the first lens and the field stop plane and the image plane, the relations $$0.425 < f_1/f_4 < 0.7 \quad (1)$$

$$1.5 < f/f_1 < 2.2 \quad (5)$$

$$f_1 < f_3 \quad (6)$$

$$1.05 < TTL/f < 1.18 \quad (7)$$

$$15 < f_{DOE}/f < 100 \quad (8)$$

are satisfied in the image forming optical system according to the second aspect of the invention.

In the image forming optical system according to the second aspect of the invention, four lenses respectively having positive power, negative power, positive power and negative power are advantageously combined to reduce spherical aberration and therefore to increase resolution. Further, a combination of the third lens which is a positive meniscus lens convex to the image side and the fourth lens which is a negative meniscus lens convex to the object side can reduce a field curvature. Further, since the field stop is located on the object side of the image side plane of the first lens, a size of the optical system can be achieved.

By designing an image forming optical system such that the above-described relations (1) and (5) to (8) are satisfied, a compact image forming optical system in which angles of incidence to the image plane of the solid-state image sensor are small and chromatic aberration, astigmatism, field curvature and distortion are reduced can be realized.

BEST MODES FOR CARRYING OUT THE INVENTION

Figure 1:
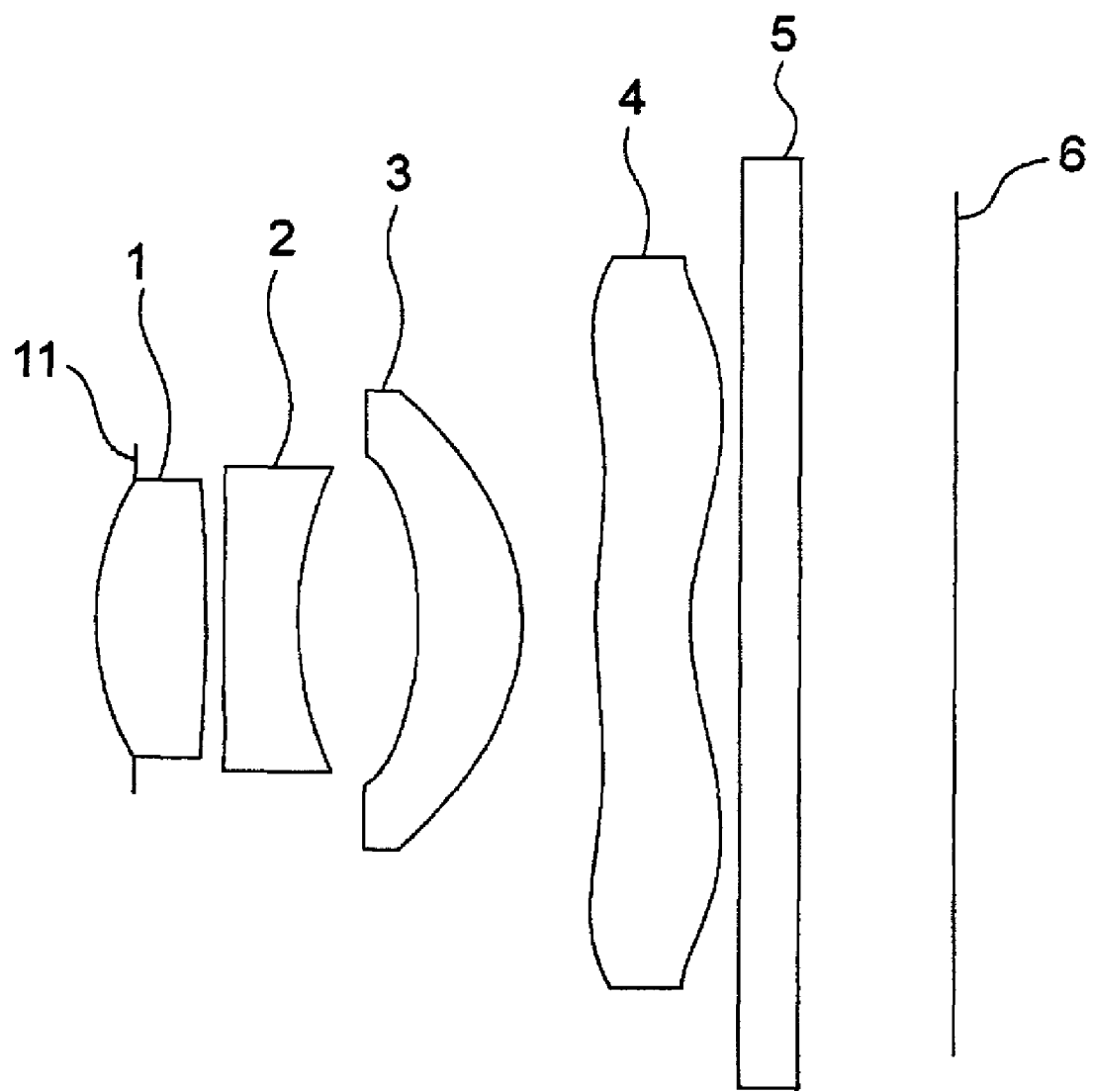
FIG. 1 shows a construction of an image forming optical system according to Example 1.

FIG. 1 shows a construction of an image forming optical system according to an embodiment of the present invention. The image forming optical system according to the embodiment includes a first lens 1, a second lens 2, a third lens 3 and a fourth lens 4 arranged from the object side to the image side. A field stop is located on the object side of the image side plane of the first lens and on the image side of the vertex of the object side plane of the first lens. Light having passed through the first lens 1, the second lens 2, the third lens 3 and the fourth lens 4 passes through a glass plate 5 and arrives at an image plane 6.

Features of the image forming optical system according to the present invention will be described below.

Types of the Four Lenses

The image forming optical system according to the embodiment of the present invention includes the first lens which is a biconvex one, the second lens which is a biconcave one, the third lens which is a positive meniscus lens convex to the image side and the fourth lens which is a negative meniscus lens convex to the object side, arranged from the object side to the image side. The combination of four lenses which respectively have positive power, negative power, positive power and negative power can reduce spherical aberration of the image forming optical system and therefore increases resolution. Since the first lens which is a biconvex one and the second lens which is a biconcave one are used on the object side, lens shapes with sag amounts smaller than those of a set of meniscus lenses can be employed and therefore production costs can be reduced. Further, the combination of the third lens which is a positive meniscus lens convex to the image side and the fourth lens which is a negative meniscus lens convex to the object side can reduce field curvature.

An absolute value of focal length of the i-th lens (i represents an integer from 1 to 4) and an absolute value of focal length of the whole optical system are defined respectively as fi and f hereinafter.

Ratio of Focal Length of the First Lens to that of the Fourth Lens

The image forming optical system according to the embodiment of the present invention is formed in such a way as to satisfy the following relation.

$$0.425 < f_1/f_4 < 0.7 \tag{1}$$

When a value of $f_1/f_4$ is reduced, angles of incidence to pixel elements of the image plane can be reduced maintaining the length and the back focus of the image forming optical system. When a value of $f_1/f_4$ is 0.425 or smaller in an image forming optical system, comatic aberration becomes larger and therefore such an image forming optical system is not preferable. When a value of $f_1/f_4$ is 0.7 or greater in an image forming optical system, angles of incidence to pixel elements of the image plane become larger and therefore such an image forming optical system is not preferable.

Ratio of Focal Length of the Whole Optical System to that of the First Lens

The image forming optical system according to the embodiment of the present invention is formed in such a way as to satisfy the following relation.

$$1.5 < f/f_1 < 2.2 \tag{5}$$

When a value of $f/f_1$ is 1.5 or smaller in an image forming optical system, size reduction can hardly be achieved. When a value of $f/f_1$ is 2.2 or greater in an image forming optical system, tolerance in working the first lens becomes smaller and therefore it will be difficult to produce the first lens.

Comparison Between Focal Length of the First Lens and that of the Third Lens

The image forming optical system according to the embodiment of the present invention is formed in such a way as to satisfy the following relation.

$$f_1 < f_3 \tag{6}$$

Since the first lens has positive power, a principal point position is located on the object side and therefore size reduction of the image forming optical system becomes easier.

Ratio of Total Length to Focal Length of the Whole Optical System

The image forming optical system according to the embodiment of the present invention is formed in such a way as to satisfy the following relation where a distance between the plane which is closer to the object between the object side plane of the first lens and the field stop plane and the image plane is represented as TTL.

$$1.05 < TTL/f < 1.18 \tag{7}$$

When a value of TTL/f is 1.05 or smaller in an image forming optical system, angles of incidence to pixel elements of the image plane become larger and therefore such an image forming optical system is not preferable. When a value of TTL/f is 1.18 or greater, size reduction can hardly be achieved.

Abbe's Number

The image forming optical system according to the embodiment of the present invention is formed in such a way as to satisfy the following relation where Abbe's number of the i-th lens is represented as $v_{di}$.

$$25 < v_{d2} < 28 \tag{2}$$

$$50 < v_{d1}, v_{d3}, v_{d4} < 57 \tag{3}$$

Since the field stop is located on the object side of the image side plane of the first lens having a positive power, chromatic aberration can be effectively reduced when a high index and high dispersion lens is used as the second lens having a negative power.

Ratio of an Absolute Value of Focal Length of the Second Lens and that of the Fourth Lens The image forming optical system according to the embodiment of the present invention is formed in such a way as to satisfy the following relation.

$$0.595 < f_2/f_4 < 1.05 \quad (4)$$

When a value of $f_2/f_4$ is 0.595 or smaller in an image forming optical system, chromatic aberration will be overcorrected. When a value of $f_2/f_4$ is 1.05 or greater in an image forming optical system, correction of chromatic aberration will be insufficient and therefore high resolution cannot be achieved.

Diffraction Grating

In place of the high-index and high dispersion lens, a diffraction grating can be used for correcting chromatic aberration.

The image forming optical system according to the embodiment of the present invention is formed in such a way as to satisfy the following relation where a focal length of the diffraction grating is represented as $f_{DOE}$.

$$15 < f_{DOE}/f < 100 \quad (8)$$

When an optical path difference function of the diffraction grating is represented as $$\phi = C2 \times h^2 + C4 \times h^4 + \ldots$$

a focal length $f_{DOE}$ of the diffraction grating is defined by the following equation.

$$f_{DOE} = 1/(2C2)$$

The optical path difference function is for specific wavelength of 587.56 nm and the first order of diffraction. In the equation defining the optical path difference function, h represents a distance from the optical axis while C2 and C4 represent constants.

When a value of $f_{DOE}$ is 15 or smaller in an image forming optical system, correction of chromatic aberration will be insufficient and therefore resolution cannot be sufficiently improved. When a value of $f_{DOE}$ is 100 or greater in an image forming optical system, chromatic aberration will be overcorrected. Further, a grating period of the diffraction grating becomes short and therefore it is difficult to produce the diffraction grating.

Examples 1 to 7 of the present invention will be described below.

Specification of Image Forming Optical Systems of the Examples

Tables 1 and 2 represent specification of image forming optical systems of Examples 1 to 7. In Table 1 unit of numerical values representing focal length is millimeter. The other numerical values are in dimensionless unit. In Table 2 unit of numerical values representing CRA is degree. Unit of the other numerical values is millimeter. In Table 1 $n_{di}$ represents refractive index of the i-th lens for light having wavelength of 587.6 nanometers. Further, "Fno." represents F-number representing brightness of the whole optical system. In Table 2 EFL represents effective focal length of the whole optical system. Further, CRA represents the maximum angle of incidence of the principal ray to pixel elements of the image plane. The maximum angle of incidence appears in the periphery of the image. BF represents back focus.

TABLE 1

| Item | Example 1 | Example 2 | Example 3 | Example 4 | Example 5 | Example 6 | Example 7 |
|---|---|---|---|---|---|---|---|
| $f_1/f_4$ | 0.43 | 0.5 | 0.66 | 0.53 | 0.48 | 0.53 | 0.54 |
| $v_{d2}$ | 26.6 | 26.6 | 26.6 | 26.6 | 26.6 | 26.6 | 26.6 |
| $v_{d1}$ | 56.1 | 56.1 | 56.1 | 56.1 | 56.1 | 56.1 | 56.1 |
| $v_{d3}$ | 56.1 | 56.1 | 56.1 | 56.1 | 56.1 | 56.1 | 56.1 |
| $v_{d4}$ | 56.1 | 56.1 | 56.1 | 56.1 | 56.1 | 56.1 | 56.1 |
| $|f_2/f_4|$ | 0.6 | 0.78 | 1 | 0.77 | 0.67 | 0.75 | 0.81 |
| $f/f_1$ | 1.6 | 1.82 | 1.68 | 1.79 | 1.77 | 1.68 | 1.61 |
| $f_1$ | 2.36 | 2.05 | 2.25 | 2.09 | 2.15 | 2.22 | 2.32 |
| $f_3$ | 4.38 | 5.83 | 3.78 | 4.5 | 4.22 | 4.03 | 4.16 |
| TTL/f | 1.16 | 1.07 | 1.14 | 1.11 | 1.14 | 1.15 | 1.15 |
| $f_{DOE}/f$ | — | — | — | — | — | — | 66.8 |
| $n_{d2}$ | 1.605 | 1.605 | 1.605 | 1.605 | 1.605 | 1.605 | 1.605 |
| $n_{d1}$ | 1.51 | 1.51 | 1.51 | 1.51 | 1.51 | 1.51 | 1.51 |
| $n_{d3}$ | 1.51 | 1.51 | 1.51 | 1.51 | 1.51 | 1.51 | 1.51 |
| $n_{d4}$ | 1.51 | 1.51 | 1.51 | 1.51 | 1.51 | 1.51 | 1.51 |
| Fno. | 2.81 | 2.8 | 2.8 | 2.81 | 2.81 | 2.8 | 2.82 |

TABLE 2

| Item | Example 1 | Example 2 | Example 3 | Example 4 | Example 5 | Example 6 | Example 7 |
|---|---|---|---|---|---|---|---|
| EFL | 3.78 | 3.73 | 3.78 | 3.74 | 3.81 | 3.74 | 3.74 |
| TTL | 4.4 | 4 | 4.3 | 4.15 | 4.35 | 4.29 | 4.29 |
| CRA | 22.6 | 25 | 24.5 | 24.2 | 23.4 | 25 | 25 |
| BF | 1.1 | 0.87 | 1 | 1.04 | 1.16 | 1.395 | 1.388 |

Example 1

FIG. 1 shows a construction of an image forming optical system according to Example 1. The image forming optical system according to Example 1 includes a first lens 1, a second lens 2, a third lens 3 and a fourth lens 4 arranged from the object side to the image side. A field stop 11 is located on the object side of the image side plane of the first lens 1 and on the image side of the vertex of the object side plane of the first lens 1. Light having passed through the first lens 1, the second lens 2, the third lens 3 and the fourth lens 4 passes through a glass plate 5 and arrives at an image plane 6.

Figure 2:
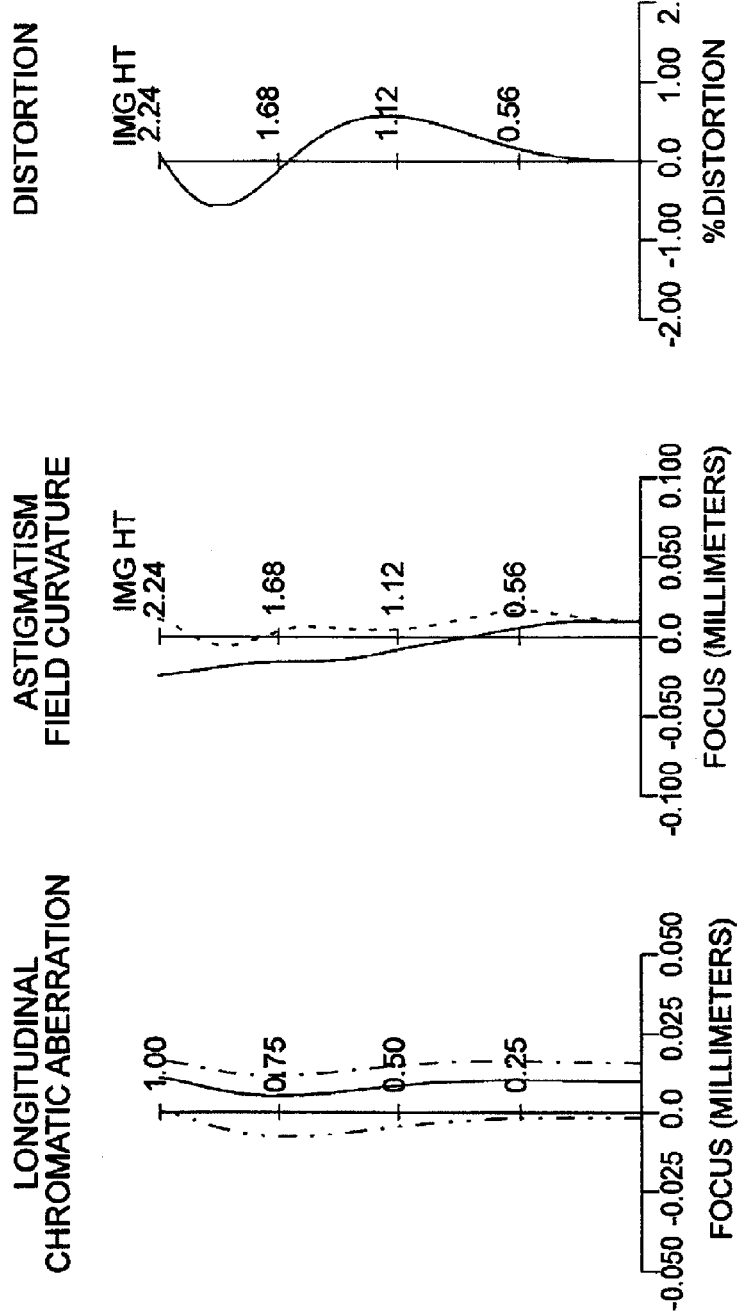
FIG. 2 shows aberrations of the image forming optical system according to Example 1.

FIG. 2 shows aberrations of the image forming optical system according to Example 1. FIG. 2(a) represents longitudinal chromatic aberration. The horizontal axis of FIG. 2(a) represents a focal position in the optical axis direction. Unit is millimeter. The vertical axis of FIG. 2(a) represents a position in the field stop plane though which light passes. "0" on the vertical axis represents that light passes through the center of the field stop plane while "1" on the vertical axis represents that light passes through the periphery of the field stop plane. FIG. 2(b) represents astigmatism and field curvature. The horizontal axis of FIG. 2(b) represents a focal position in the optical axis direction. Unit is millimeter. The vertical axis of FIG. 2(b) represents height of the image. Unit is millimeter. A dotted line represents a position of the meridional image surface while a solid line represents a position of the sagital image surface. FIG. 2(c) represents distortion. The horizontal axis of FIG. 2(c) represents distortion. The vertical axis of FIG. 2(c) represents height of the image. Unit is millimeter.

Table 3 represents lens data of the image forming optical system according to Example 1. In Table 3 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 4 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

$$h = \sqrt{x^2 + y^2}$$

$$c = \frac{1}{R}$$

$$Z = \frac{ch^2}{1 + \sqrt{1 - (1+k)c^2 h^2}} + \sum_{i=1}^{m} A_i h^i$$

TABLE 3

| Plane No. | Comments | Thickness | Refractive index | Abbe's number | Surface shape |
|---|---|---|---|---|---|
| Field stop | | −0.173 | 1 | | |
| 2 | First lens | 0.560 | 1.51 | 56.1 | Aspherical |
| 3 | First lens | 0.090 | 1 | | Aspherical |
| 4 | Second lens | 0.380 | 1.605 | 26.6 | Aspherical |
| 5 | Second lens | 0.620 | 1 | | Aspherical |
| 6 | Third lens | 0.540 | 1.51 | 56.1 | Aspherical |
| 7 | Third lens | 0.381 | 1 | | Aspherical |
| 8 | Fourth lens | 0.480 | 1.51 | 56.1 | Aspherical |
| 9 | Fourth lens | 0.253 | 1 | | Aspherical |
| 10 | | 0.300 | 1.517 | 64.2 | Flat |
| 11 | | 0.796 | 1 | | Flat |
| Image plane | | 0 | | | |

TABLE 4

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.421 | −6.816 | 16.969 | 1.768 | −2.045 | −1.163 | 2.816 | 1.323 |
| k | 0.000 | 0.000 | 0.000 | −2.371 | 4.415 | −0.284 | −31.433 | −7.835 |
| A4 | 8.74E−03 | 1.43E−01 | 7.93E−02 | 6.95E−02 | 7.54E−02 | 7.12E−02 | −1.34E−01 | −9.82E−02 |
| A6 | 8.98E−03 | −3.52E−01 | −4.05E−01 | −1.57E−01 | −2.01E−01 | −8.88E−02 | 5.44E−02 | 2.77E−02 |
| A8 | −1.98E−02 | 3.44E−01 | 3.63E−01 | 1.52E−01 | 3.17E−01 | 1.01E−01 | −6.87E−03 | −8.33E−03 |
| A10 | −1.25E−03 | −1.45E−01 | −5.89E−02 | −4.75E−02 | −1.45E−01 | −2.24E−02 | 2.70E−04 | 1.30E−03 |

Example 2

Figure 3:
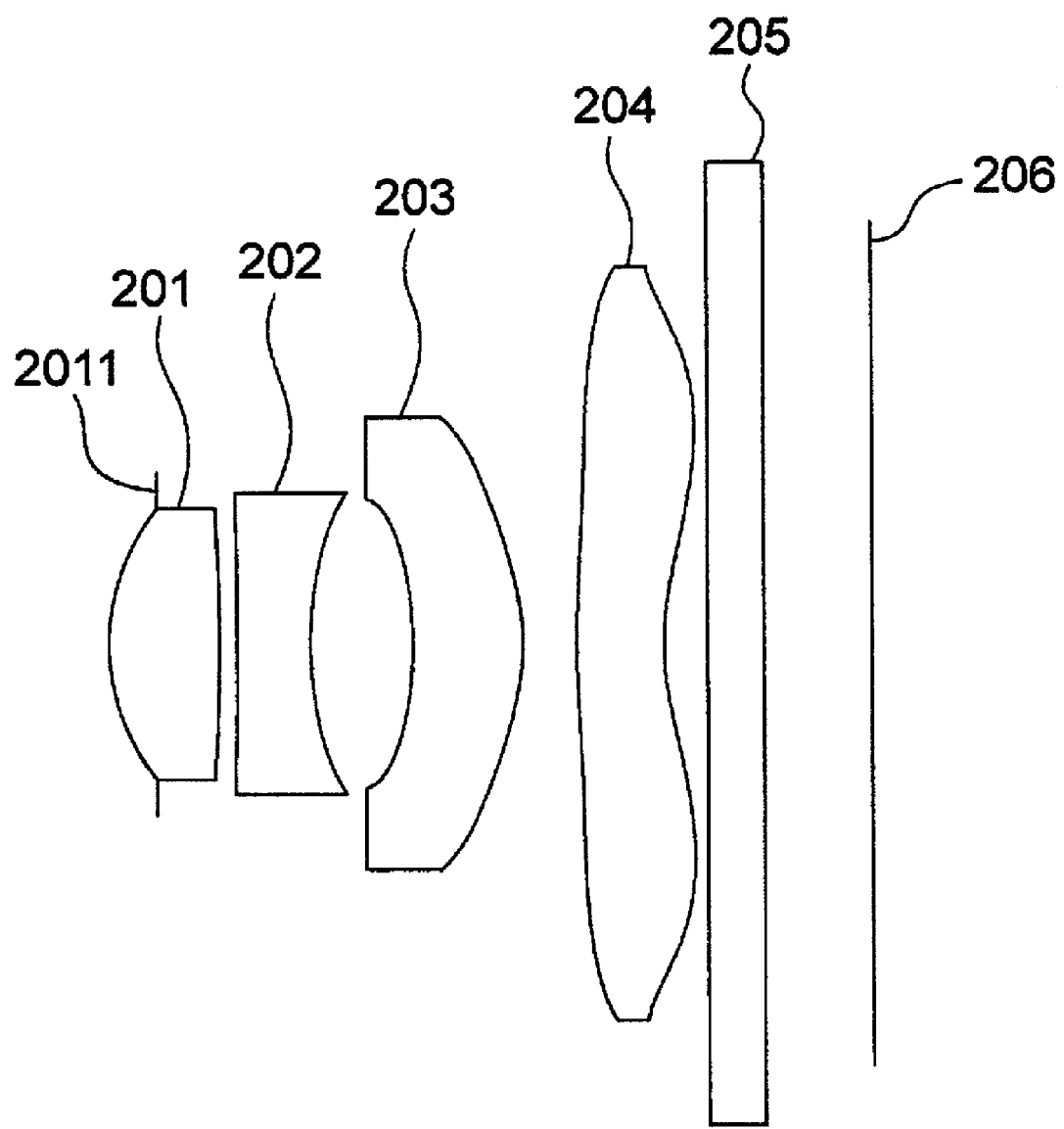
FIG. 3 shows a construction of an image forming optical system according to Example 2.

FIG. 3 shows a construction of an image forming optical system according to Example 2. The image forming optical system according to Example 2 includes a first lens 201, a second lens 202, a third lens 203 and a fourth lens 204 arranged from the object side to the image side. A field stop 2011 is located on the object side of the image side plane of the first lens 201 and on the image side of the vertex of the object side plane of the first lens 201. Light having passed through the first lens 201, the second lens 202, the third lens 203 and the fourth lens 204 passes through a glass plate 205 and arrives at an image plane 206.

Figure 4:
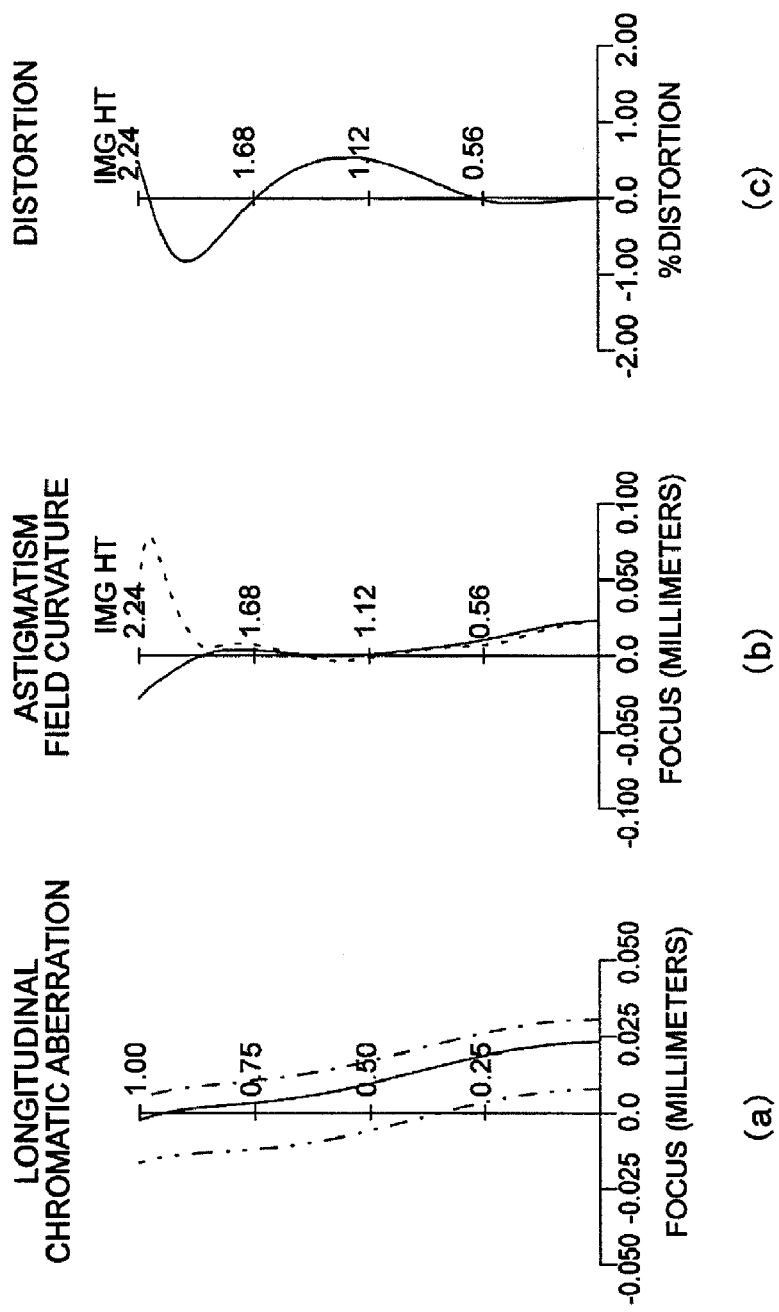
FIG. 4 shows aberrations of the image forming optical system according to Example 2.

FIG. 4 shows aberrations of the image forming optical system according to Example 2. FIG. 4(a) represents longitudinal chromatic aberration. The horizontal axis of FIG. 4(a) represents a focal position in the optical axis direction. Unit is millimeter. The vertical axis of FIG. 4(a) represents a position in the field stop plane though which light passes. "0" on the vertical axis represents that light passes through the center of the field stop plane while "1" on the vertical axis represents that light passes through the rim of the field stop plane. FIG. 4(b) represents astigmatism and field curvature. The horizontal axis of FIG. 4(b) represents a focal position in the optical axis direction. Unit is millimeter. The vertical axis of FIG. 4(b) represents height of the image. Unit is millimeter. A dotted line represents a position of the meridional image surface while a solid line represents a position of the sagital image surface. FIG. 4(c) represents distortion. The horizontal axis of FIG. 4(c) represents distortion. The vertical axis of FIG. 4(c) represents height of the image. Unit is millimeter.

Table 5 represents lens data of the image forming optical system according to Example 2. In Table 5 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 6 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

$$h = \sqrt{x^2 + y^2}$$

$$c = \frac{1}{R}$$

$$Z = \frac{ch^2}{1 + \sqrt{1 - (1+k)c^2h^2}} + \sum_{i=1}^{m} A_i h^i$$

Example 3

Figure 5:
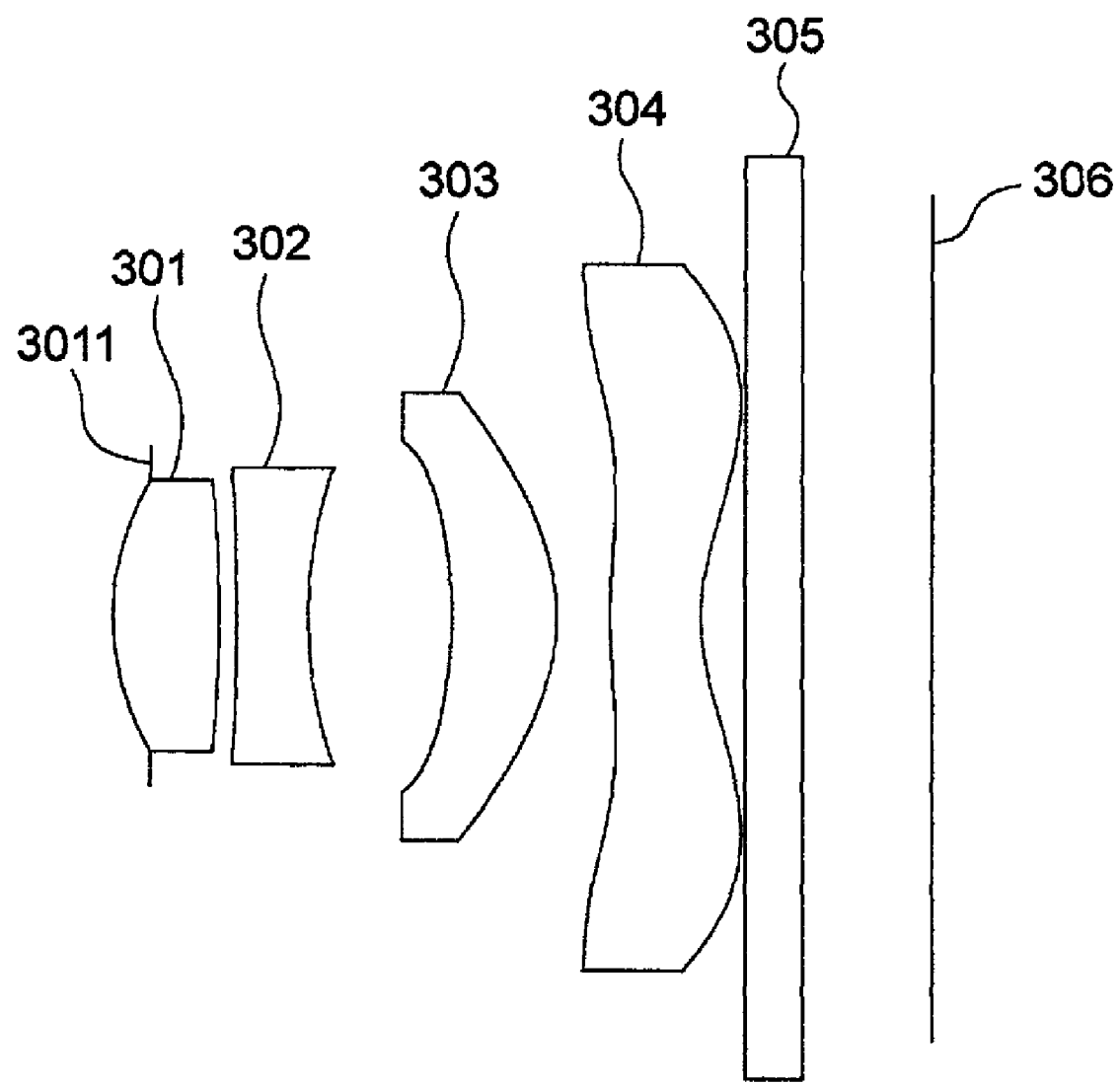
FIG. 5 shows a construction of an image forming optical system according to Example 3.

FIG. 5 shows a construction of an image forming optical system according to Example 3. The image forming optical system according to Example 3 includes a first lens 301, a second lens 302, a third lens 303 and a fourth lens 304 arranged from the object side to the image side. A field stop 3011 is located on the object side of the image side plane of the first lens 301 and on the image side of the vertex of the object side plane of the first lens 301. Light having passed through the first lens 301, the second lens 302, the third lens 303 and the fourth lens 304 passes through a glass plate 305 and arrives at an image plane 306.

Figure 6:
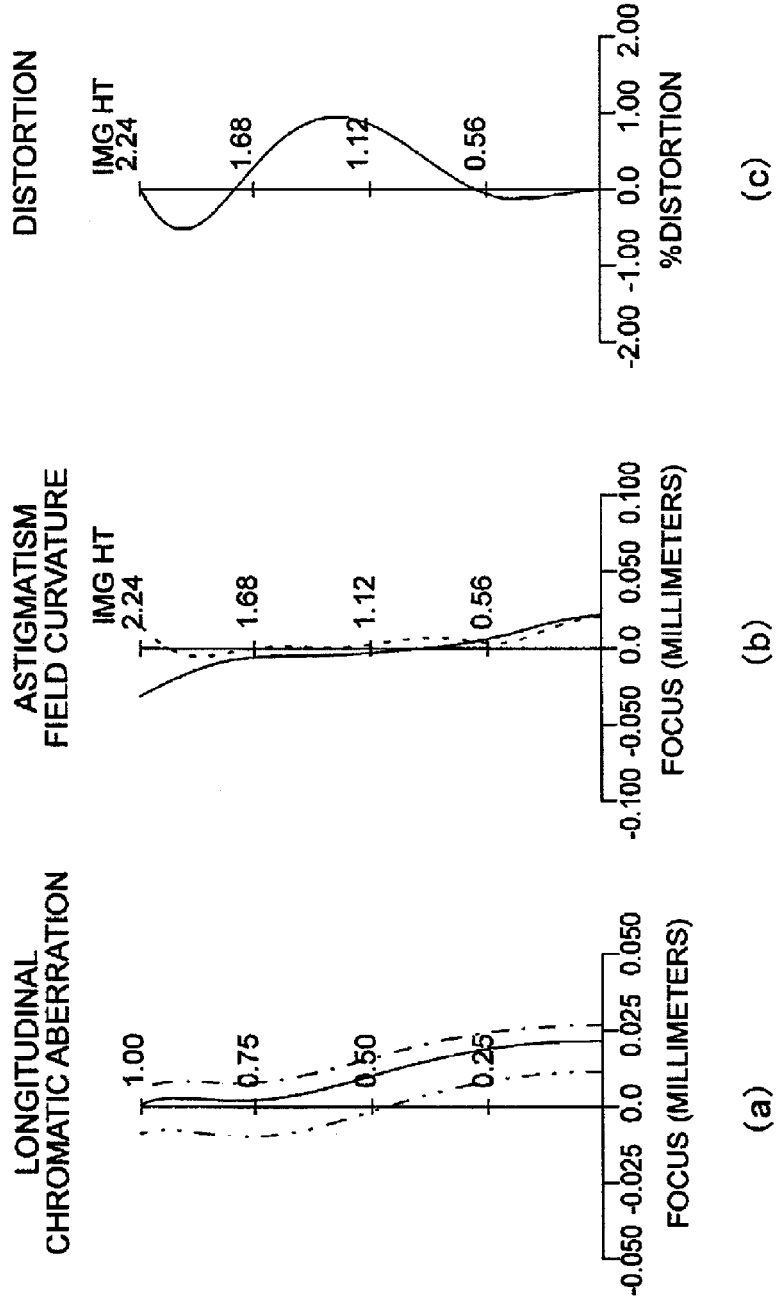
FIG. 6 shows aberrations of the image forming optical system according to Example 3.

FIG. 6 shows aberrations of the image forming optical system according to Example 3. FIG. 6(a) represents longitudinal chromatic aberration. The horizontal axis of FIG. 6(a) represents a focal position in the optical axis direction. Unit is millimeter. The vertical axis of FIG. 6(a) represents a position in the field stop plane though which light passes. "0" on the vertical axis represents that light passes through the center of the field stop plane while "1" on the vertical axis represents that light passes through the rim of the field stop plane. FIG. 6(b) represents astigmatism and field curvature. The horizontal axis of FIG. 6(b) represents a focal position in the optical axis direction. Unit is millimeter. The vertical axis of FIG. 6(b) represents height of the image. Unit is millimeter. A dotted line represents a position of the meridional image surface while a solid line represents a position of the sagital image surface. FIG. 6(c) represents distortion. The horizontal axis of FIG. 6(c) represents distortion. The vertical axis of FIG. 6(c) represents height of the image. Unit is millimeter.

Table 7 represents lens data of the image forming optical system according to Example 3. In Table 7 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 8 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

TABLE 5

| Plane No. | Comments | Thickness | Refractive index | Abbe's number | Surface shape |
|---|---|---|---|---|---|
| Field stop | | −0.204 | 1 | | |
| 2 | First lens | 0.570 | 1.51 | 56.1 | Aspherical |
| 3 | First lens | 0.090 | 1 | | Aspherical |
| 4 | Second lens | 0.380 | 1.605 | 26.6 | Aspherical |
| 5 | Second lens | 0.540 | 1 | | Aspherical |
| 6 | Third lens | 0.580 | 1.51 | 56.1 | Aspherical |
| 7 | Third lens | 0.284 | 1 | | Aspherical |
| 8 | Fourth lens | 0.460 | 1.51 | 56.1 | Aspherical |
| 9 | Fourth lens | 0.230 | 1 | | Aspherical |
| 10 | | 0.300 | 1.517 | 64.2 | Flat |
| 11 | | 0.569 | 1 | | Flat |
| Image plane | | 0 | | | |

TABLE 6

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.171 | −8.160 | −31.771 | 2.088 | −2.032 | −1.323 | 4.739 | 1.399 |
| k | 0.000 | 0.000 | 0.000 | −0.446 | 5.924 | −0.129 | −31.433 | −8.792 |
| A4 | 2.96E−03 | 7.24E−02 | 3.43E−02 | 5.65E−02 | 1.32E−01 | 2.61E−01 | −8.15E−02 | −8.33E−02 |
| A6 | 0.00E+00 | −8.12E−02 | −1.28E−01 | −4.01E−02 | −2.40E−01 | −1.94E−01 | 4.97E−02 | 2.45E−02 |
| A8 | 0.00E+00 | 0.00E+00 | 9.49E−02 | 1.23E−01 | 2.79E−01 | 1.48E−01 | −1.19E−02 | −7.47E−03 |
| A10 | 0.00E+00 | 0.00E+00 | −6.64E−02 | 0.00E+00 | −1.94E−01 | −5.20E−02 | 1.12E−03 | 1.01E−03 |

$$h = \sqrt{x^2 + y^2}$$

$$c = \frac{1}{R}$$

$$Z = \frac{ch^2}{1 + \sqrt{1 - (1+k)c^2h^2}} + \sum_{i=1}^{m} A_i h^i$$

TABLE 7

| Plane No. | Comments | Thickness | Refractive index | Abbe's number | Surface shape |
|---|---|---|---|---|---|
| Field stop | | −0.169 | 1 | | |
| 2 | First lens | 0.560 | 1.51 | 56.1 | Aspherical |
| 3 | First lens | 0.090 | 1 | | Aspherical |
| 4 | Second lens | 0.380 | 1.605 | 26.6 | Aspherical |
| 5 | Second lens | 0.748 | 1 | | Aspherical |
| 6 | Third lens | 0.540 | 1.51 | 56.1 | Aspherical |
| 7 | Third lens | 0.278 | 1 | | Aspherical |
| 8 | Fourth lens | 0.480 | 1.51 | 56.1 | Aspherical |
| 9 | Fourth lens | 0.230 | 1 | | Aspherical |
| 10 | | 0.300 | 1.517 | 64.2 | Flat |
| 11 | | 0.694 | 1 | | Flat |
| Image plane | | 0 | | | |

TABLE 8

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.421 | −5.199 | −11.618 | 2.533 | −2.468 | −1.162 | 3.319 | 1.087 |
| k | 0.000 | 0.000 | 0.000 | −1.103 | 5.696 | −0.348 | −31.433 | −6.188 |
| A4 | 1.12E−03 | 1.55E−01 | 1.49E−01 | 8.14E−02 | 1.22E−01 | 2.01E−01 | −1.53E−01 | −9.87E−02 |
| A6 | 1.67E−02 | −3.30E−01 | −4.53E−01 | −1.75E−01 | −2.28E−01 | −1.78E−01 | 5.77E−02 | 2.84E−02 |
| A8 | −5.05E−02 | 2.60E−01 | 4.30E−01 | 1.71E−01 | 2.77E−01 | 1.53E−01 | −6.94E−03 | −8.47E−03 |
| A10 | 1.82E−02 | −8.72E−02 | −1.24E−01 | −4.09E−02 | −1.38E−01 | −4.16E−02 | 1.01E−04 | 1.02E−03 |

Example 4

Figure 7:
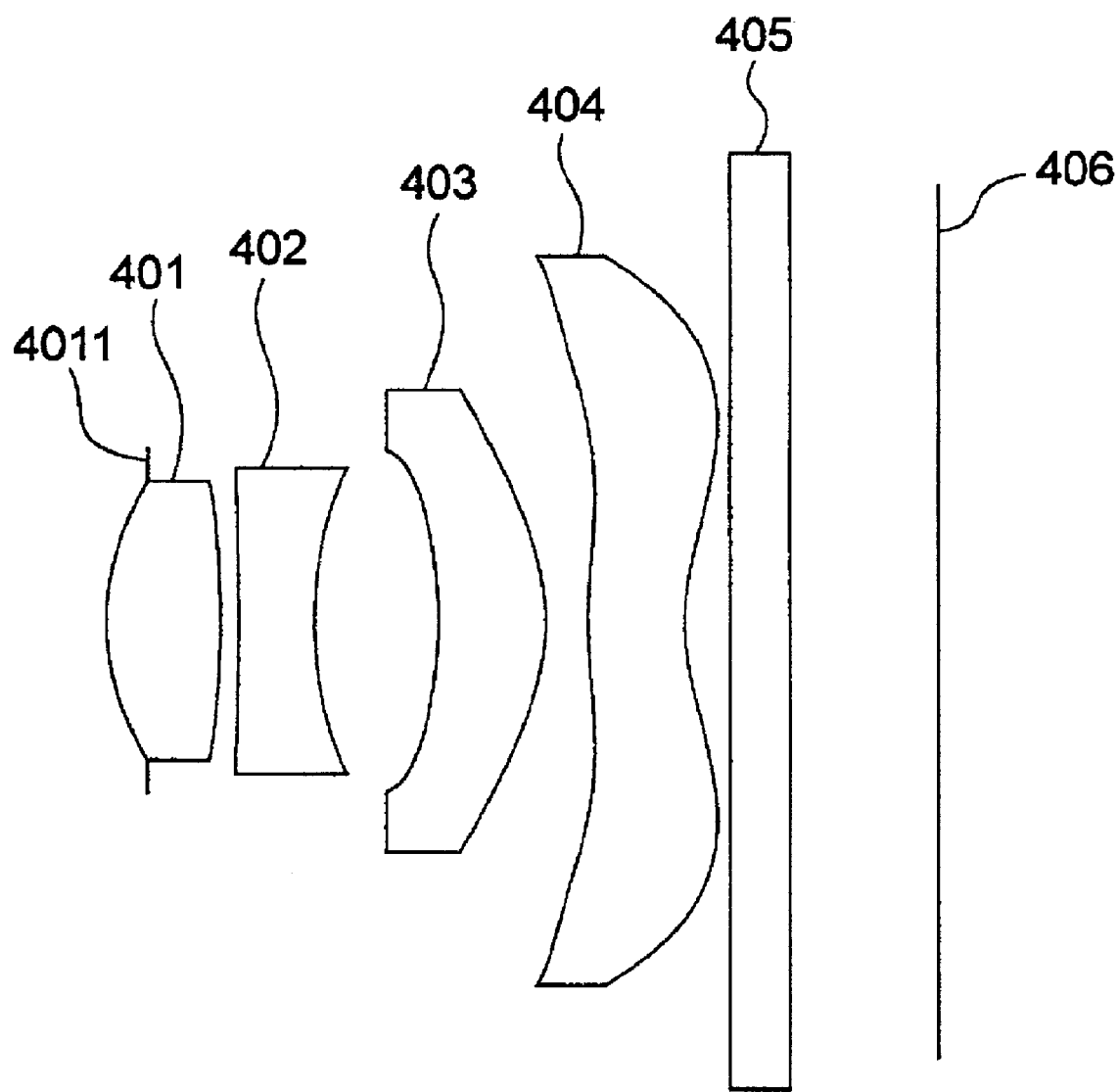
FIG. 7 shows a construction of an image forming optical system according to Example 4.

FIG. 7 shows a construction of an image forming optical system according to Example 4. The image forming optical system according to Example 4 includes a first lens 401, a second lens 402, a third lens 403 and a fourth lens 404 arranged from the object side to the image side. A field stop 4011 is located on the object side of the image side plane of the first lens 401 and on the image side of the vertex of the object side plane of the first lens 401. Light having passed through the first lens 401, the second lens 402, the third lens 403 and the fourth lens 404 passes through a glass plate 405 and arrives at an image plane 406.

Figure 8:
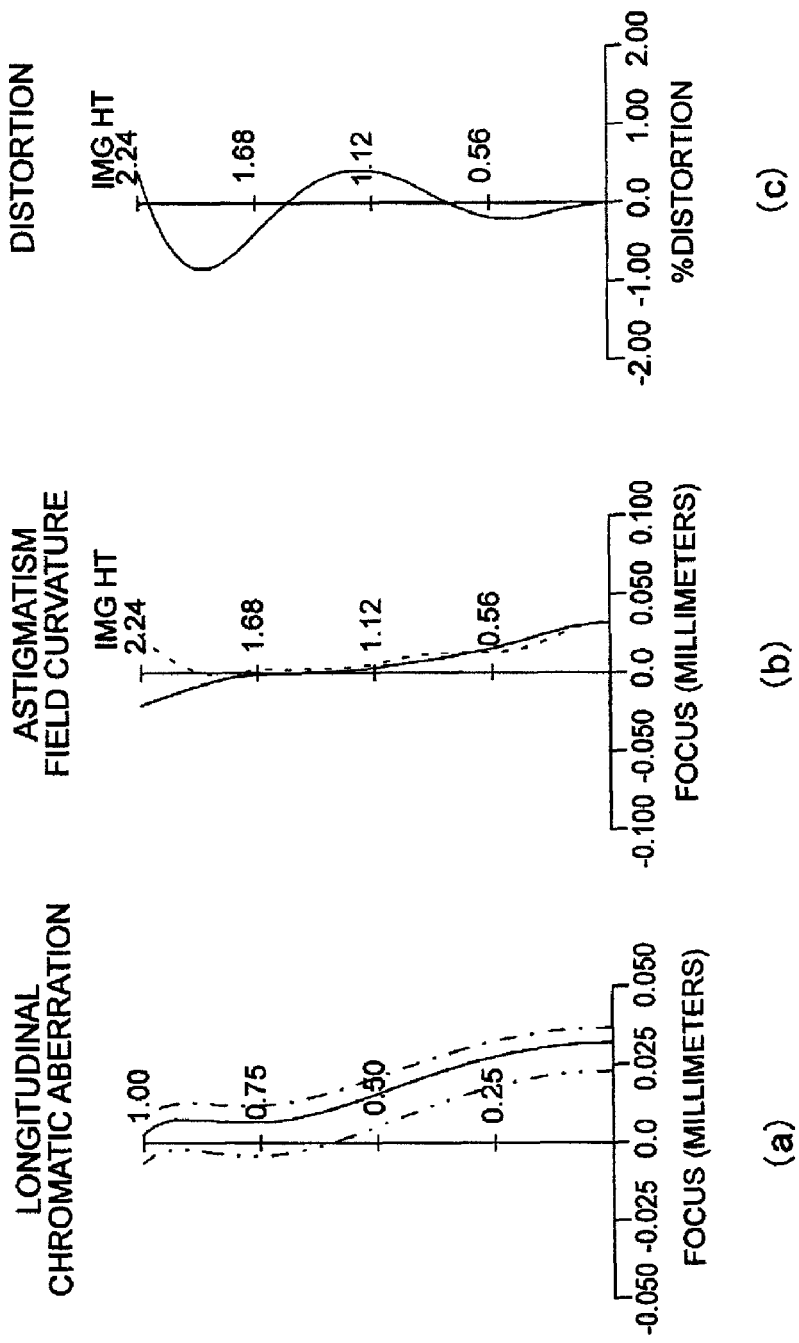
FIG. 8 shows aberrations of the image forming optical system according to Example 4.

FIG. 8 shows aberrations of the image forming optical system according to Example 4. FIG. 8(*a*) represents longitudinal chromatic aberration. The horizontal axis of FIG. 8 (*a*) represents a focal position in the optical axis direction. Unit is millimeter. The vertical axis of FIG. 8(*a*) represents a position in the field stop plane though which light passes. "0" on the vertical axis represents that light passes through the center of the field stop plane while "1" on the vertical axis represents that light passes through the rim of the field stop plane. FIG. 8(*b*) represents astigmatism and field curvature. The horizontal axis of FIG. 8(*b*) represents a focal position in the optical axis direction. Unit is millimeter. The vertical axis of FIG. 8(*b*) represents height of the image. Unit is millimeter. A dotted line represents a position of the meridional image surface while a solid line represents a position of the sagital image surface. FIG. 8(*c*) represents distortion. The horizontal axis of FIG. 8(*c*) represents distortion. The vertical axis of FIG. 8(*c*) represents height of the image. Unit is millimeter.

Table 9 represents lens data of the image forming optical system according to Example 4. In Table 9 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 10 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

$$h = \sqrt{x^2 + y^2}$$

$$c = \frac{1}{R}$$

$$Z = \frac{ch^2}{1 + \sqrt{1 - (1+k)c^2h^2}} + \sum_{i=1}^{m} A_i h^i$$

TABLE 9

| Plane No. | Comments | Thickness | Refractive index | Abbe's number | Surface shape |
|---|---|---|---|---|---|
| Field stop | | −0.170 | 1 | | |
| 2 | First lens | 0.560 | 1.51 | 56.1 | Aspherical |
| 3 | First lens | 0.090 | 1 | | Aspherical |
| 4 | Second lens | 0.380 | 1.605 | 26.6 | Aspherical |
| 5 | Second lens | 0.623 | 1 | | Aspherical |
| 6 | Third lens | 0.540 | 1.51 | 56.1 | Aspherical |
| 7 | Third lens | 0.214 | 1 | | Aspherical |
| 8 | Fourth lens | 0.480 | 1.51 | 56.1 | Aspherical |
| 9 | Fourth lens | 0.230 | 1 | | Aspherical |
| 10 | | 0.300 | 1.517 | 64.2 | Flat |
| 11 | | 0.735 | 1 | | Flat |
| Image plane | | 0 | | | |

TABLE 10

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.343 | −4.393 | −11.529 | 2.238 | −2.279 | −1.235 | 2.945 | 1.132 |
| k | 0.000 | 0.000 | 0.000 | −1.328 | 5.622 | −0.283 | −31.433 | −7.330 |
| A4 | −6.97E−03 | 1.44E−01 | 1.50E−01 | 8.88E−02 | 1.51E−01 | 2.03E−01 | −1.63E−01 | −1.16E−01 |
| A6 | 3.26E−03 | −3.44E−01 | −4.62E−01 | −1.54E−01 | −2.36E−01 | −1.66E−01 | 6.00E−02 | 3.16E−02 |
| A8 | −5.87E−02 | 2.31E−01 | 4.78E−01 | 1.69E−01 | 2.80E−01 | 1.56E−01 | −6.50E−03 | −9.70E−03 |
| A10 | −3.83E−02 | −7.83E−02 | −8.62E−02 | 2.59E−02 | −1.50E−01 | −4.66E−02 | −1.98E−04 | 1.06E−03 |

Example 5

Figure 9:
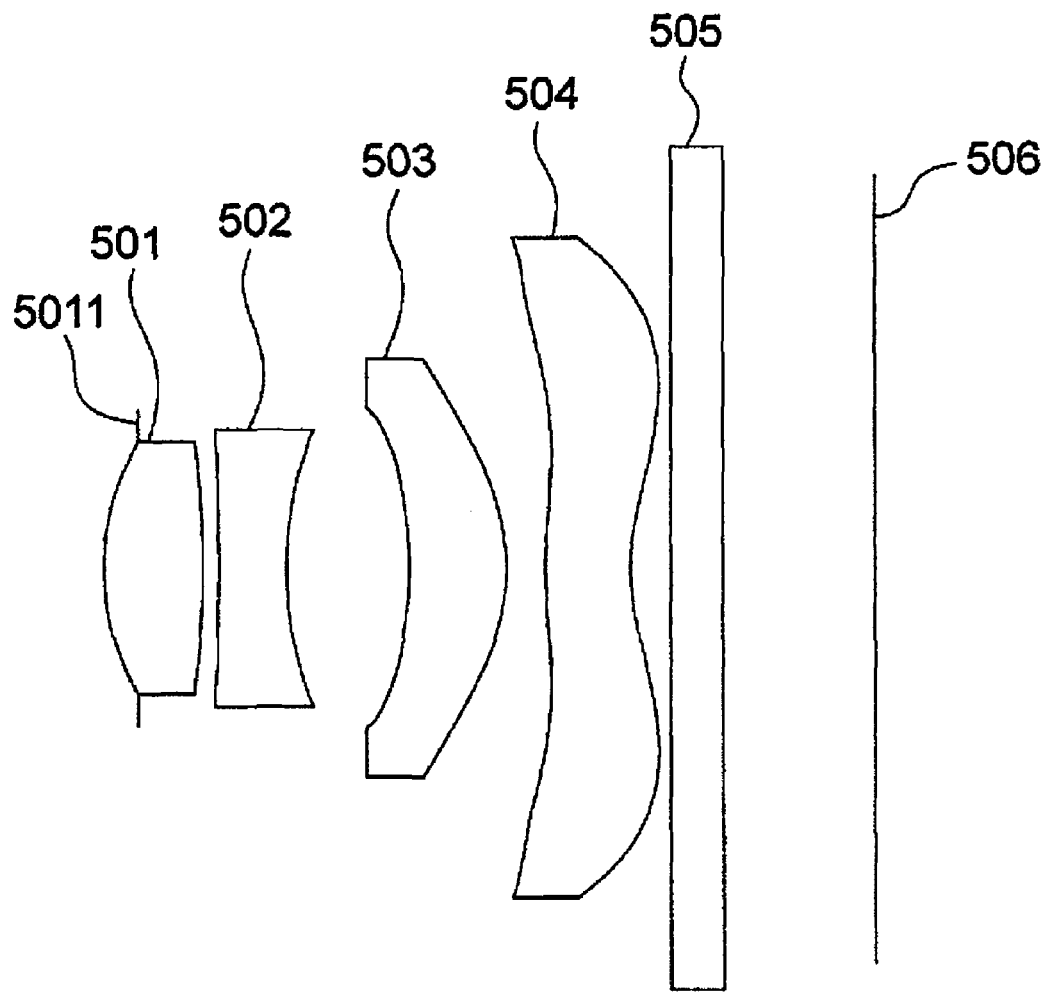
FIG. 9 shows a construction of an image forming optical system according to Example 5.

FIG. 9 shows a construction of an image forming optical system according to Example 5. The image forming optical system according to Example 5 includes a first lens 501, a second lens 502, a third lens 503 and a fourth lens 504 arranged from the object side to the image side. A field stop 5011 is located on the object side of the image side plane of the first lens 501 and on the image side of the vertex of the object side plane of the first lens 501. Light having passed through the first lens 501, the second lens 502, the third lens 503 and the fourth lens 504 passes through a glass plate 505 and arrives at an image plane 506.

Figure 10:
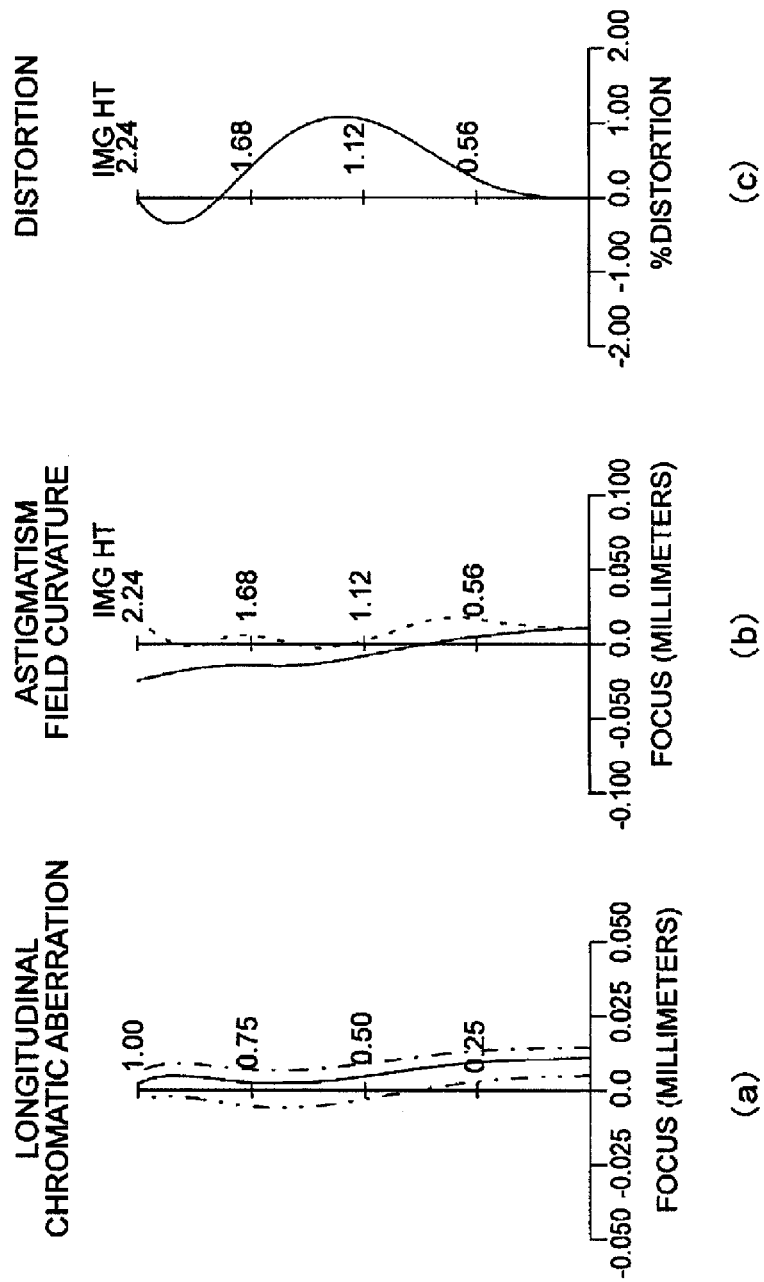
FIG. 10 shows aberrations of the image forming optical system according to Example 5.

FIG. 10 shows aberrations of the image forming optical system according to Example 5. FIG. 10(a) represents longitudinal chromatic aberration. The horizontal axis of FIG. 10(a) represents a focal position in the optical axis direction. Unit is millimeter. The vertical axis of FIG. 10(a) represents a position in the field stop plane though which light passes. "0" on the vertical axis represents that light passes through the center of the field stop plane while "1" on the vertical axis represents that light passes through the rim of the field stop plane. FIG. 10(b) represents astigmatism and field curvature. The horizontal axis of FIG. 10(b) represents a focal position in the optical axis direction. Unit is millimeter. The vertical axis of FIG. 10(b) represents height of the image. Unit is millimeter. A dotted line represents a position of the meridional image surface while a solid line represents a position of the sagital image surface. FIG. 10(c) represents distortion. The horizontal axis of FIG. 10(c) represents distortion. The vertical axis of FIG. 10(c) represents height of the image. Unit is millimeter.

Table 11 represents lens data of the image forming optical system according to Example 5. In Table 11 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 12 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

$$h = \sqrt{x^2 + y^2}$$

$$c = \frac{1}{R}$$

$$Z = \frac{ch^2}{1 + \sqrt{1 - (1+k)c^2 h^2}} + \sum_{i=1}^{m} A_i h^i$$

TABLE 11

| Plane No. | Comments | Thickness | Refractive index | Abbe's number | Surface shape |
|---|---|---|---|---|---|
| Field stop | | −0.173 | 1 | | |
| 2 | First lens | 0.560 | 1.51 | 56.1 | Aspherical |
| 3 | First lens | 0.090 | 1 | | Aspherical |
| 4 | Second lens | 0.380 | 1.605 | 26.6 | Aspherical |
| 5 | Second lens | 0.687 | 1 | | Aspherical |
| 6 | Third lens | 0.540 | 1.51 | 56.1 | Aspherical |
| 7 | Third lens | 0.217 | 1 | | Aspherical |
| 8 | Fourth lens | 0.480 | 1.51 | 56.1 | Aspherical |
| 9 | Fourth lens | 0.230 | 1 | | Aspherical |
| 10 | | 0.300 | 1.517 | 64.2 | Flat |
| 11 | | 0.865 | 1 | | Flat |
| Image plane | | 0 | | | |

TABLE 12

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.408 | −4.306 | −10.014 | 2.246 | −2.423 | −1.225 | 2.875 | 1.205 |
| k | 0.000 | 0.000 | 0.000 | −1.525 | 5.673 | −0.267 | −31.433 | −7.466 |
| A4 | −4.16E−03 | 1.58E−01 | 1.50E−01 | 7.75E−02 | 1.30E−01 | 1.68E−01 | −1.56E−01 | −1.08E−01 |
| A6 | 1.85E−02 | −3.24E−01 | −4.58E−01 | −1.60E−01 | −2.42E−01 | −1.57E−01 | 5.86E−02 | 2.80E−02 |
| A8 | −6.15E−02 | 2.32E−01 | 4.86E−01 | 1.73E−01 | 3.06E−01 | 1.62E−01 | −6.66E−03 | −7.88E−03 |
| A10 | 6.14E−03 | −4.91E−02 | −1.27E−01 | −1.66E−02 | −1.48E−01 | −4.61E−02 | −8.30E−05 | 8.64E−04 |

Example 6

Figure 11:
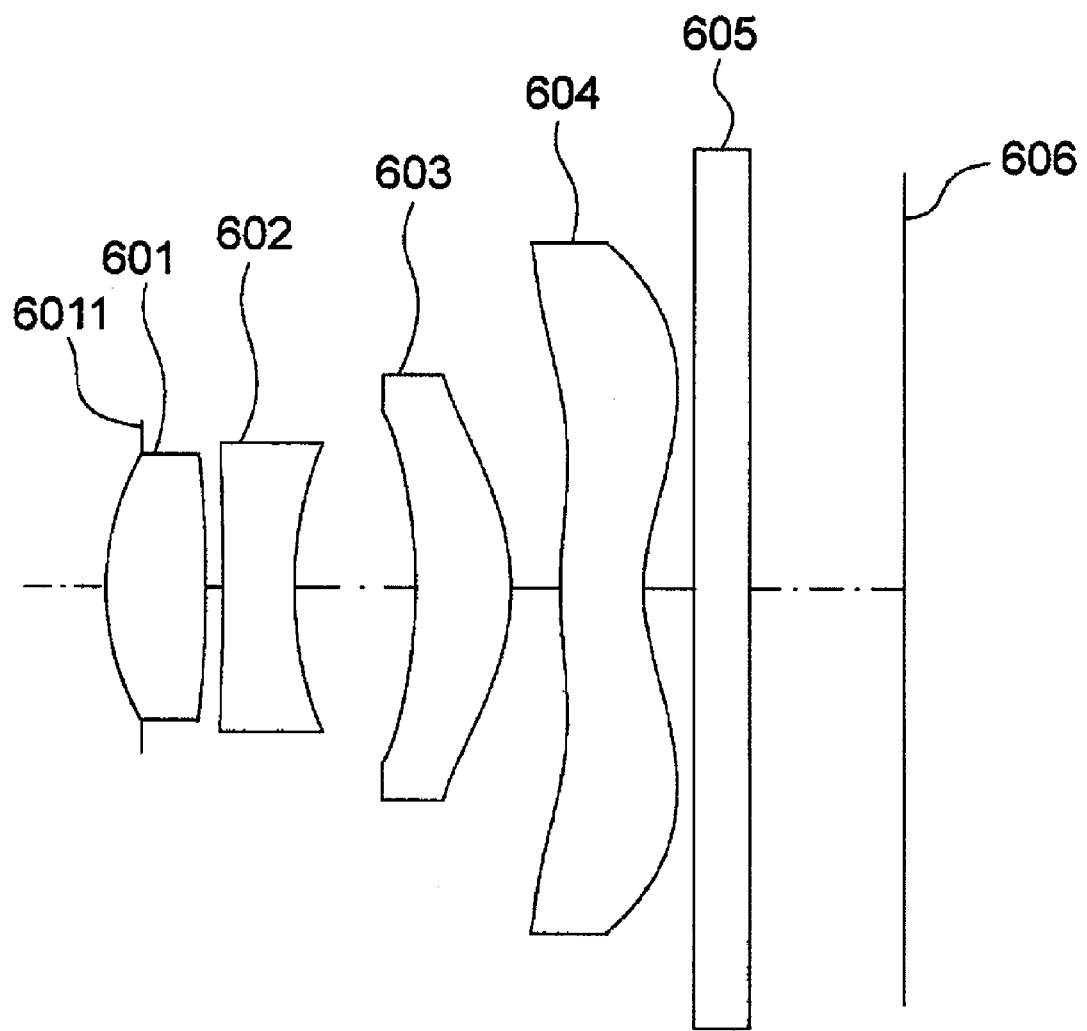
FIG. 11 shows a construction of an image forming optical system according to Example 6.

FIG. 11 shows a construction of an image forming optical system according to Example 6. The image forming optical system according to Example 6 includes a first lens 601, a second lens 602, a third lens 603 and a fourth lens 604 arranged from the object side to the image side. A field stop 6011 is located on the object side of the image side plane of the first lens 601 and on the image side of the vertex of the object side plane of the first lens 601. Light having passed through the first lens 601, the second lens 602, the third lens 603 and the fourth lens 604 passes through a glass plate 605 and arrives at an image plane 606.

Figure 12:
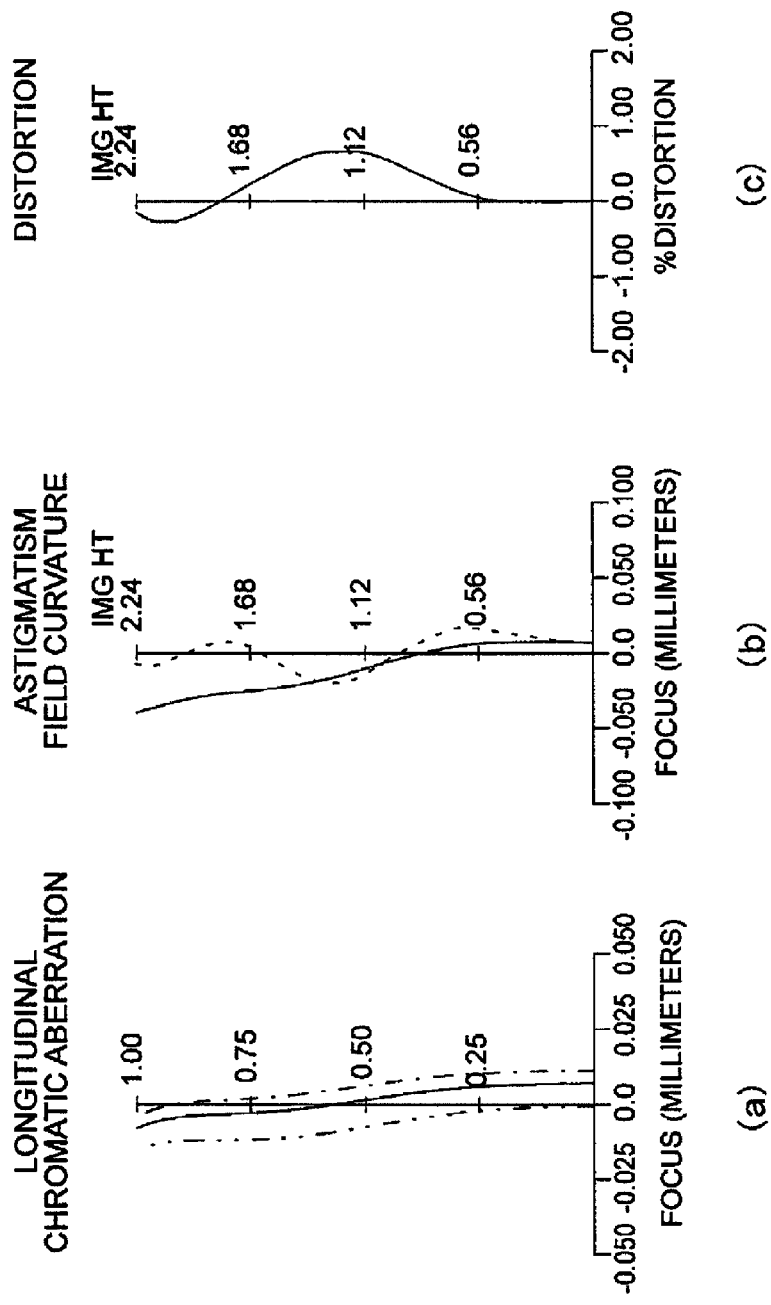
FIG. 12 shows aberrations of the image forming optical system according to Example 6.

FIG. 12 shows aberrations of the image forming optical system according to Example 6. FIG. 12(*a*) represents longitudinal chromatic aberration. The horizontal axis of FIG. 12(*a*) represents a focal position in the optical axis direction. Unit is millimeter. The vertical axis of FIG. 12(*a*) represents a position in the field stop plane though which light passes. "0" on the vertical axis represents that light passes through the center of the field stop plane while "1" on the vertical axis represents that light passes through the rim of the field stop plane. FIG. 12(*b*) represents astigmatism and field curvature. The horizontal axis of FIG. 12(*b*) represents a focal position in the optical axis direction. Unit is millimeter. The vertical axis of FIG. 12(*b*) represents height of the image. Unit is millimeter. A dotted line represents a position of the meridional image surface while a solid line represents a position of the sagital image surface. FIG. 12(*c*) represents distortion. The horizontal axis of FIG. 12(*c*) represents distortion. The vertical axis of FIG. 12(*c*) represents height of the image. Unit is millimeter.

Table 13 represents lens data of the image forming optical system according to Example 6. In Table 13 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 14 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

$$h = \sqrt{x^2 + y^2}$$

$$c = \frac{1}{R}$$

$$Z = \frac{ch^2}{1 + \sqrt{1 - (1+k)c^2 h^2}} + \sum_{i=1}^{m} A_i h^i$$

TABLE 13

| Plane No. | Comments | Thickness | Refractive index | Abbe's number | Surface shape |
|---|---|---|---|---|---|
| Field stop | | −0.166 | 1 | | |
| 2 | First lens | 0.544 | 1.51 | 56.1 | Aspherical |
| 3 | First lens | 0.090 | 1 | | Aspherical |
| 4 | Second lens | 0.380 | 1.605 | 26.6 | Aspherical |
| 5 | Second lens | 0.645 | 1 | | Aspherical |
| 6 | Third lens | 0.517 | 1.51 | 56.1 | Aspherical |
| 7 | Third lens | 0.269 | 1 | | Aspherical |
| 8 | Fourth lens | 0.448 | 1.51 | 56.1 | Aspherical |
| 9 | Fourth lens | 0.276 | 1 | | Aspherical |
| 10 | | 0.300 | 1.517 | 64.2 | Flat |
| 11 | | 0.819 | 1 | | Flat |
| Image plane | | 0 | | | |

TABLE 14

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.429 | −4.790 | −11.266 | 2.322 | −2.606 | −1.226 | 2.292 | 1.037 |
| k | 0.000 | 0.000 | 0.000 | −0.700 | 5.242 | −0.265 | −31.433 | −7.282 |
| A4 | −3.01E−03 | 1.48E−01 | 1.51E−01 | 8.63E−02 | 1.73E−01 | 1.94E−01 | −1.61E−01 | −1.08E−01 |
| A6 | 1.87E−02 | −3.07E−01 | −4.57E−01 | −1.69E−01 | −2.62E−01 | −1.55E−01 | 5.97E−02 | 2.83E−02 |
| A8 | −6.37E−02 | 2.29E−01 | 5.10E−01 | 1.81E−01 | 2.98E−01 | 1.67E−01 | −6.60E−03 | −6.93E−03 |
| A10 | 1.69E−02 | −3.15E−02 | −1.34E−01 | 1.45E−02 | −1.28E−01 | −4.58E−02 | −6.70E−05 | 6.51E−04 |

Example 7

Figure 13:
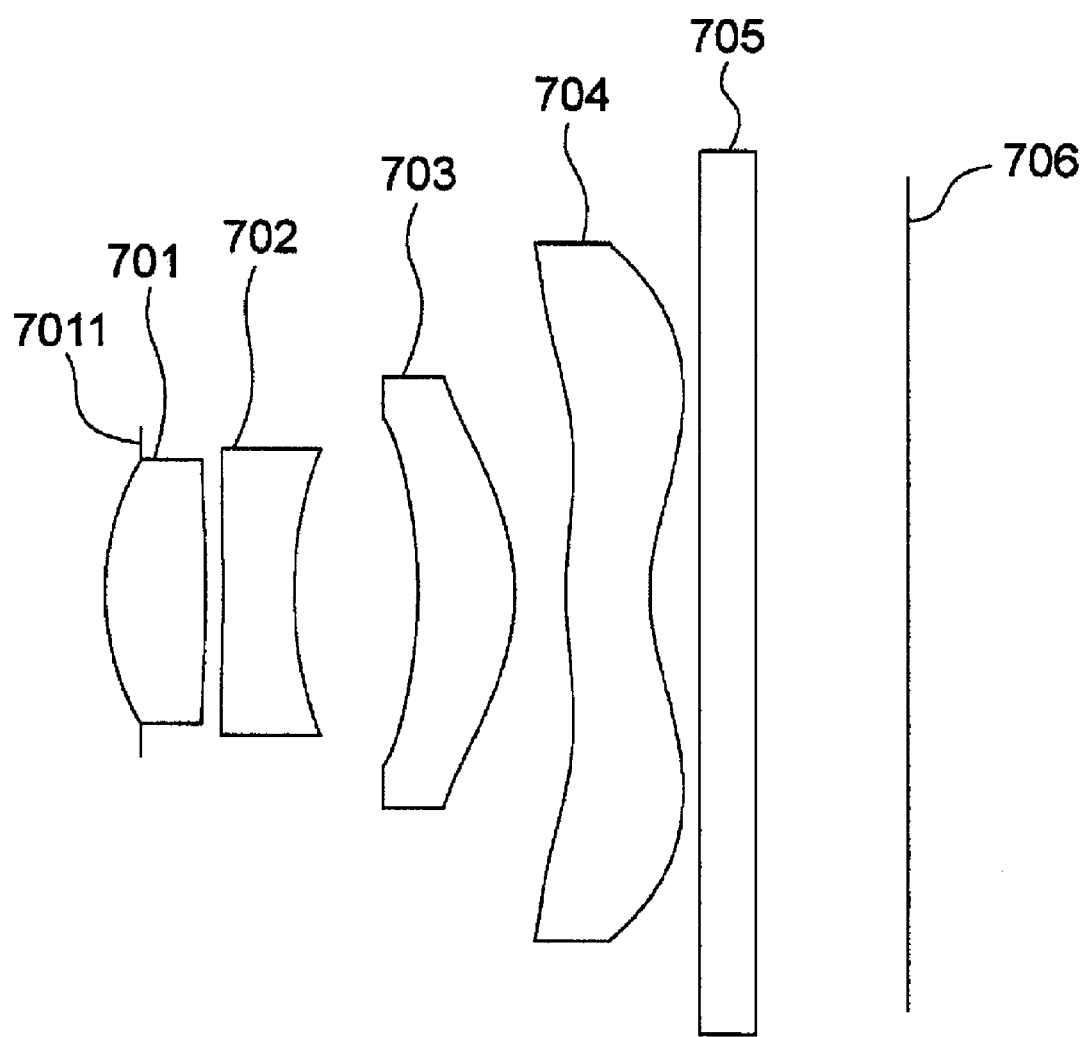
FIG. 13 shows a construction of an image forming optical system according to Example 7.

FIG. 13 shows a construction of an image forming optical system according to Example 7. The image forming optical system according to Example 7 includes a first lens 701, a second lens 702, a third lens 703 and a fourth lens 704 arranged from the object side to the image side. A field stop 7011 is located on the object side of the image side plane of the first lens 701 and on the image side of the vertex of the object side plane of the first lens 701. Light having passed through the first lens 701, the second lens 702, the third lens 703 and the fourth lens 704 passes through a glass plate 705 and arrives at an image plane 706.

Figure 14:
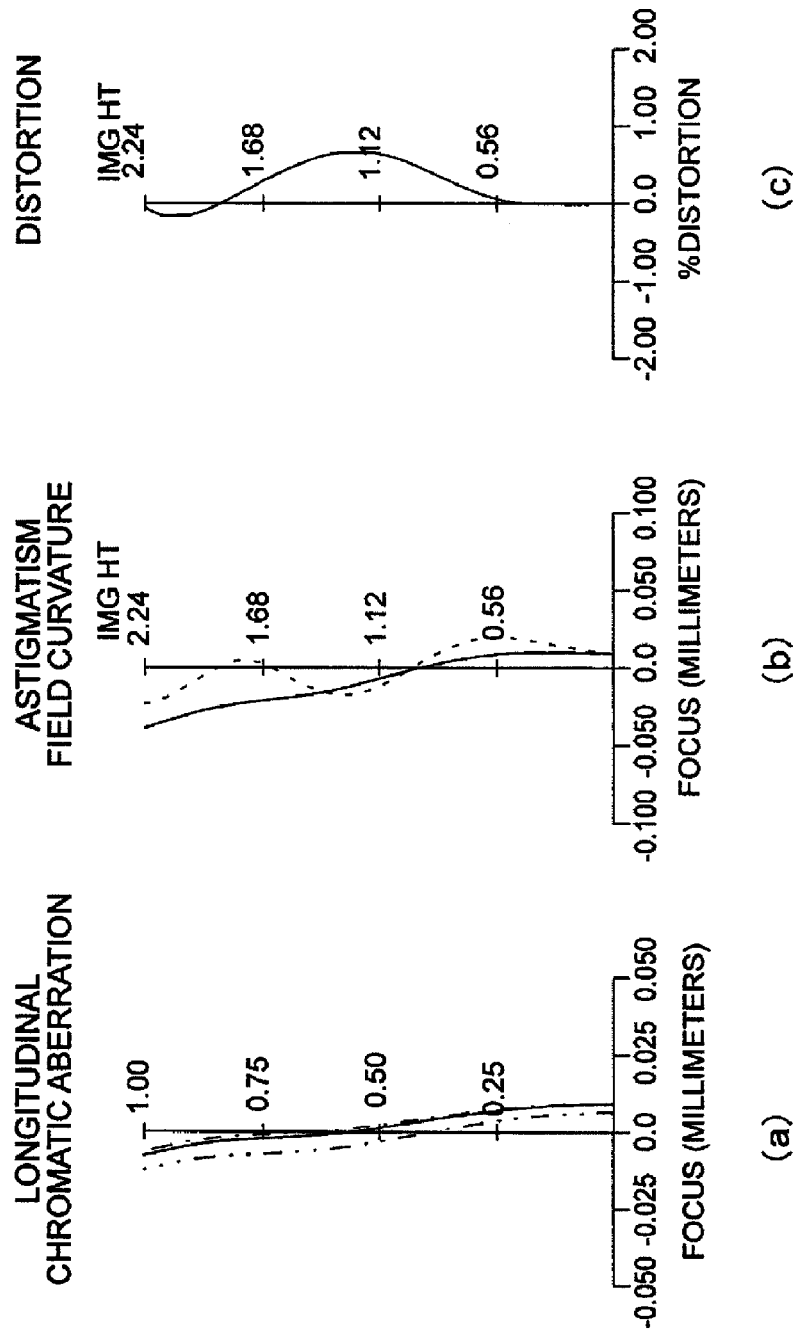
FIG. 14 shows aberrations of the image forming optical system according to Example 7.

FIG. 14 shows aberrations of the image forming optical system according to Example 7. FIG. 14(*a*) represents longitudinal chromatic aberration. The horizontal axis of FIG.

14(a) represents a focal position in the optical axis direction. Unit is millimeter. The vertical axis of FIG. 14(a) represents a position in the field stop plane though which light passes. "0" on the vertical axis represents that light passes through the center of the field stop plane while "1" on the vertical axis represents that light passes through the rim of the field stop plane. FIG. 14(b) represents astigmatism and field curvature. The horizontal axis of FIG. 14(b) represents a focal position in the optical axis direction. Unit is millimeter. The vertical axis of FIG. 14(b) represents height of the image. Unit is millimeter. A dotted line represents a position of the meridional image surface while a solid line represents a position of the sagital image surface. FIG. 14(c) represents distortion. The horizontal axis of FIG. 14(c) represents distortion. The vertical axis of FIG. 14(c) represents height of the image. Unit is millimeter.

Table 15 represents lens data of the image forming optical system according to Example 7. In Table 15 "thickness" of the field stop is a position of the second plane with respect to the position of the field stop where the image side is set positive. As to other planes, for example, "thickness" of the second plane (the object side plane of the first lens) is the interval between the second plane and the third plane (the image side plane of the first lens).

Table 16 represents coefficients and constants of the equations representing aspherical surfaces of the second to the ninth planes. In an orthogonal coordinate system in which the optical axis of the image forming optical system is defined as z-axis and coordinates in a plane perpendicular to the optical axis are represented as x, y, an aspherical surface is formed by rotating the quadratic curve represented by the following equation around the optical axis, that is z-axis and therefore the aspherical surface has rotation symmetry with respect to the optical axis. "k" represents a constant defining a shape of the quadratic curve and "c" represents a curvature at the center. Further, "A" represents a correcting coefficient.

$$h = \sqrt{x^2 + y^2}$$

$$c = \frac{1}{R}$$

$$Z = \frac{ch^3}{1 + \sqrt{1 - (1+k)c^2h^2}} + \sum_{i=1}^{m} A_i h^i$$

The first lens is provided with a diffraction grating on the image side plane. An optical path difference function is represented by the following equation.

$$\varphi = C2 \times h^2 + C4 \times h^4 + \ldots$$

The optical path difference function is for specific wavelength of 587.56 nm and the first order of diffraction. In the equation representing the optical path difference function h represents a distance from the optical axis while C2 and C4 represent constants.

Table 17 shows constants of the optical path difference function.

TABLE 15

| Plane No. | Comments | Thickness | Refractive index | Abbe's number | Surface shape |
|---|---|---|---|---|---|
| Field stop | | −0.166 | 1 | | |
| 2 | First lens | 0.536 | 1 | | Aspherical |
| 3 | First lens | 0.090 | 1.51 | 56.1 | DOE |
| 4 | Second lens | 0.380 | 1 | | Aspherical |
| 5 | Second lens | 0.658 | 1.605 | 26.6 | Aspherical |
| 6 | Third lens | 0.513 | 1 | | Aspherical |
| 7 | Third lens | 0.273 | 1.51 | 56.1 | Aspherical |
| 8 | Fourth lens | 0.452 | 1 | | Aspherical |
| 9 | Fourth lens | 0.269 | 1.51 | 56.1 | Aspherical |
| 10 | | 0.300 | 1 | | Flat |
| 11 | | 0.819 | 1.517 | 64.2 | Flat |
| Image plane | | 0 | 1 | | |

TABLE 16

| Aspherical Coeff. | Second plane | Third plane | Fourth plane | Fifth plane | Sixth plane | Seventh plane | Eighth plane | Ninth plane |
|---|---|---|---|---|---|---|---|---|
| R | 1.426 | −6.366 | −18.164 | 2.397 | −2.523 | −1.232 | 2.320 | 1.053 |
| k | 0.000 | 0.000 | 0.000 | −1.463 | 5.241 | −0.261 | −31.433 | −7.373 |
| A4 | 3.28E−03 | 1.38E−01 | 1.34E−01 | 8.39E−02 | 1.73E−01 | 1.90E−01 | −1.62E−01 | −1.08E−01 |
| A6 | 2.27E−02 | −2.70E−01 | −4.33E−01 | −1.63E−01 | −2.61E−01 | −1.55E−01 | 5.97E−02 | 2.83E−02 |
| A8 | −6.49E−02 | 2.35E−01 | 5.45E−01 | 1.77E−01 | 3.01E−01 | 1.68E−01 | −6.50E−03 | −6.91E−03 |
| A10 | 7.00E−02 | 4.12E−02 | −1.62E−01 | 5.78E−04 | −1.26E−01 | −4.62E−02 | −8.00E−05 | 6.46E−04 |

TABLE 17

| Coefficients of optical path difference function | Third plane |
|---|---|
| C2 | −0.002 |
| C4 | 0.0008 |

The features of the embodiments of the present invention will be described below.

Position of the Field Stop

In an image forming optical system according to an embodiment of the present invention, the field stop is located on the object side of the image side plane of the first lens and on the image side of vertex of the object side plane of the first lens.

Since the field stop is located on the object side of the image side plane of the first lens and on the image side of the vertex of the object side plane of the first lens, a size of the whole image forming optical system (a distance between the plane which is on the object side between the image side plane of the first lens and the field stop plane) and the image plane) can be reduced.

Refractive Index of the Second Lens

In an image forming optical system according to another embodiment of the present invention, assuming that $n_{di}$ represents a refractive index of the i-th lens for light having a wavelength of 587.6 nanometers, the following relation is further satisfied.

$$1.6 < n_{d2} < 1.62 \quad (9)$$

The refractive power of the second lens can be increased by increasing the refractive index to obtain larger divergence of the central ray of the light beam. As a result, an angle of incidence of the central ray at the periphery can be reduced. Values of the upper and lower limits of Equation (9) are within a range of refractive index of fluoro-olefin type polyester among various types of plastic used for lenses. Since the material has a high refractive index, a low water-absorbing property and is easy to be molded to a thin thickness, it is preferable for a lens material of an image forming optical system according to the present invention.

Refractive Indexes of the First, Third and Fourth Lenses

In an image forming optical system according to another embodiment of the present invention, assuming that $n_{di}$ represents a refractive index of the i-th lens for light having a wavelength of 587.6 nanometers, the following relations are further satisfied.

$$n_{d1} < 1.515 \quad (10)$$

$$n_{d3} < 1.515 \quad (11)$$

$$n_{d4} < 1.515 \quad (12)$$

A tolerance in machining a lens can be increased when a refractive index of the lens is reduced. Accordingly, refractive indexes of the first, third and fourth lenses should preferably be smaller than that of the second lens.

F-Number

In an image forming optical system according to another embodiment of the present invention, assuming that Fno. represents F-number indicating brightness of the whole optical system, the following relation is further satisfied.

$$2.75 < \text{Fno.} < 3.0 \quad (13)$$

An image forming optical system with Fno. of 2.75 or smaller is difficult to produce, because a tolerance in machining a lens and that in assembling the lens become small. An image forming optical system with Fno. of 3.0 or larger lacks quantity of light and therefore susceptible to a shake. Further, the numerical aperture (NA) becomes small and resolution is decreased.

Material of Lens

In an image forming optical system according to another embodiment of the present invention, all lenses are made of plastic. Accordingly, all lenses can be produced by molding and therefore the optical system is suitable for volume production.

What is claimed is:

1. An image forming optical system comprising a first lens which is a biconvex lens, a second lens which is a biconcave lens, a third lens which is a positive meniscus lens convex to the image side and a fourth lens which is a negative meniscus lens convex to the object side, arranged from the object side to the image side, wherein a field stop is located on the object side of the image side plane of the first lens and assuming that fi represents an absolute value of focal length of the i-th lens, f represents an absolute value of focal length of the whole optical system, $v_{di}$ represents Abbe's number of the i-th lens and TTL represents a distance between the plane which is closer to the object between the object side plane of the first lens and the field stop plane and the image plane, the relations $$0.425 < f_1/f_4 < 0.7 \quad (1)$$

$$25 < v_{d2} < 28 \quad (2)$$

$$50 < v_{d1}, v_{d3}, v_{d4} < 57 \quad (3)$$

$$0.595 < f_2/f_4 < 1.05 \quad (4)$$

$$1.5 < f/f_1 < 2.2 \quad (5)$$

$$f_1 < f_3 \quad (6)$$

$$1.05 < TTL/f < 1.18 \quad (7)$$

are satisfied.

2. An image forming optical system according to claim 1, wherein the field stop is located on the image side of the vertex of the object side plane of the first lens.

3. An image forming optical system according to claim 1, wherein assuming that $n_{di}$ represents a refractive index of the i-th lens for light having a wavelength of 587.6 nanometers, the following relation is further satisfied:

$$1.6 < n_{d2} < 1.62 \quad (9).$$

4. An image forming optical system according to claim 1, wherein assuming that $n_{di}$ represents a refractive index of the i-th lens for light having a wavelength of 587.6 nanometers, the following relations are further satisfied:

$$n_{d1} < 1.515 \quad (10)$$

$$n_{d3} < 1.515 \quad (11)$$

$$n_{d4} < 1.515 \quad (12).$$

5. An image forming optical system according to claim 1, wherein assuming that Fno. represents F-number indicating brightness of the whole optical system, the following relation is further satisfied:

$$2.75 < \text{Fno.} < 3.0 \quad (13).$$

6. An image forming optical system according to claim 1, wherein all lenses are made of plastic.

7. An image forming optical system comprising a first lens which is a biconvex lens, a second lens which is a biconcave lens, a third lens which is a positive meniscus lens convex to the image side and a fourth lens which is a negative meniscus lens convex to the object side, arranged from the object side to the image side, wherein a field stop is located on the object side of the image side plane of the first lens, the image side plane of the first lens is provided with a diffraction grating and assuming that fi represents an absolute value of focal length of the i-th lens, $f_{DOE}$ represents a focal length of the diffraction grating, f represents an absolute value of focal length of the whole optical system and TTL represents a distance between the plane which is closer to the object between the object side plane of the first lens and the field stop plane and the image plane, the relations $$0.425 < f_1/f_4 < 0.7 \quad (1)$$

$$1.5 < f/f_1 < 2.2 \quad (5)$$

$$f_1 < f_3 \quad (6)$$

$$1.05 < TTL/f < 1.18 \quad (7)$$

$$15 < f_{DOE}/f < 100 \quad (8)$$

are satisfied.

* * * * *